(12) United States Patent
Border et al.

(10) Patent No.: US 6,586,096 B2
(45) Date of Patent: *Jul. 1, 2003

(54) POLYMETHYLMETHACRYLATE NANOCOMPOSITE OPTICAL ARTICLE AND METHOD OF MAKING SAME

(75) Inventors: John Border, Walworth, NY (US); Michael R. McGovern, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 83 days.

This patent is subject to a terminal disclaimer.

(21) Appl. No.: 09/748,634

(22) Filed: Dec. 22, 2000

(65) Prior Publication Data

US 2002/0119313 A1 Aug. 29, 2002

(51) Int. Cl.[7] .................................................. B32B 5/16
(52) U.S. Cl. ...................... 428/402; 428/403; 428/404; 428/407; 524/492; 524/493; 523/318; 523/319
(58) Field of Search .................................. 428/402, 403, 428/404, 407; 524/492, 493; 523/318, 319

(56) References Cited

U.S. PATENT DOCUMENTS

| 3,915,914 A | | 10/1975 | Binder et al. ................. 524/71 |
| 5,470,910 A | * | 11/1995 | Spanhel ....................... 524/785 |
| 5,726,247 A | | 3/1998 | Michalczyk et al. ........ 525/102 |
| 5,910,522 A | * | 6/1999 | Schmidt ...................... 523/168 |
| 6,020,419 A | * | 2/2000 | Bock .............................. 524/590 |

FOREIGN PATENT DOCUMENTS

| WO | WO 97/10527 | 3/1997 |
| WO | WO 99/61383 | 12/1999 |

OTHER PUBLICATIONS

C. Becker, P. Mueller, and H. Schmidt, "Optical and Thermomechanical Investigations on Thermoplastic Nanocomposites with Surface Modified Silica Nanoparticles" SPIE Conference on Organic–Inorganic Hybrid Materials for Photonics, San Diego, California, Jul. 1998, SPIE vol. 3469, pp. 88–98.

B. Braune, P. Muller, and H. Schmidt, "Tantalum oxide nanomers for optical applications" SPIE Conference on Organic–Inorganic Hybrid Materials for Photonics, San Diego, California, Jul. 1998, SPIE vol. 3469, pp. 124–132.

Lucien Prod'homme, "A new approach to the thermal change in the refractive index of glasses" Physics and Chemistry of Glasses vol. 1 No. 4, Aug. 1960, pp. 119–122.

* cited by examiner

Primary Examiner—Leszek Kiliman
(74) Attorney, Agent, or Firm—Clyde E. Bailey, Sr.

(57) ABSTRACT

An optical nanocomposite material has a nanoparticulate filler dispersed in a host plastic material. According to the method of making the nanocomposite material, a predetermined temperature sensitive optical vector, such as refractive index, of the plastic host material and nanoparticulate filler are directionally opposed resulting in a nanocomposite material having significantly improved stability of the refractive index with respect to temperature.

9 Claims, 3 Drawing Sheets

POLYMETHYLMETHACRYLATE NANOCOMPOSITE OPTICAL ARTICLE AND METHOD OF MAKING SAME

CROSS-REFERENCE TO RELATED APPLICATIONS

The present application is related to U.S. application Ser. No. 09/747,705 now U.S. Pat. No. 6,518,353, filed Dec. 22, 2000, by Border, et al., and entitled, "Reduced Temperature Sensitive Polymeric Optical Article And Method Of Making Same;" U.S. application Ser. No. 09/748,635 now pending, filed Dec. 22, 2000, by Border, et al., and entitled, "Cyclic Olefin Polymeric Nanocomposite Optical Plastic Article And Method Of Making Same;" U.S. application Ser. No. 09/748,636 now U.S. Pat. No. 6,498,208, filed Dec. 22, 2000, by Border, et al., and entitled, "Polystyrene Nanocomposite Optical Plastic Article And Method Of Making Same;" U.S. application Ser. No. 09/747,706 now pending, filed Dec. 22, 2000, by Border, et al., and entitled, "Polycarbonate Nanocomposite Optical Plastic Article And Method Of Making Same;" U.S. application Ser. No. 09/747,707 now U.S. Pat. No. 6,441,077, filed Dec. 22, 2000, by Border, et al., and entitled, "Polysulfone Nanocomposite Optical Plastic Article And Method Of Making Same."

FIELD OF THE INVENTION

The invention relates generally to the field of polymeric optical articles. More particularly, the invention concerns polymeric optical materials and articles, such as plastic lenses, that maintain stable performance characteristics over a broad temperature range.

BACKGROUND OF THE INVENTION

Plastic lenses and glass lenses often perform the same function in optical systems, such as in cameras, microscopes, telescopes and opthalmic wear. The two main attributes that separate plastic lenses from glass lenses are cost and optical stability. Plastic lenses typically cost $\frac{1}{100}^{th}$ the price of a similar glass lens. On the other hand, the stability of the refractive index of a glass lens with respect to temperature and humidity is typically 100 times better than that of a plastic lens.

The difference in cost is due largely to the difference in manufacturing processes that are required for the two materials and the relative temperatures that the materials must be formed at. Plastic lenses are typically produced at 230° C. using injection molding at cycle times that are 10 times faster than glass lenses that are largely produced by grinding and polishing or compression molding at 625° C. Grinding and polishing are labor intensive while the high temperatures that glass must be formed at requires expensive mold materials and extensive maintenance costs.

In contrast, the difference in optical stability between plastic and glass is due to differences in their basic material properties. This difference in optical stability results in substantially more variation in focus and image quality in articles such as cameras when plastic lenses are used in place of glass. What is desired, and a remaining challenge in the art, is a material with the optical stability of glass that processes like a plastic. While optical plastic materials such as cyclic olefins greatly improve the refractive index stability with respect to humidity, improving the refractive index stability with respect to temperature has remained an opportunity. A study on the competing fundamental material characteristics that determine the sign and the magnitude of the dn/dT of glasses is available, for instance, by Lucien Prod'homme, "A new approach to the thermal change in the refractive index of glasses," Physics and Chemistry of Glasses, Vol. 1, No. 4, Aug. The two competing effects that determine the dn/dT in glasses are the density change which produces a negative dn/dT and the electronic polarizability which produces a positive dn/dT. The net dn/dT in a glass material depends on which effect dominates. In optical plastics however, there is not an electronic polarizability so that all unfilled materials have negative dn/dT values. None the less, the article by Prod'homme does identify the possibility of using glass-like fillers with positive dn/dT values to substantially alter the dn/dT of a filled plastic composite material.

Nanoparticulate fillers have been used to modify the index of refraction of optical plastics. By using a filler small enough that it is well below the wavelength of visible light (400–700 nm), the filler will not scatter the light and the filled plastic can retain its transparency. WIPO Patent WO97/10527 describes the use of nanoparticles to increase the refractive index of plastics for opthalmic applications. In addition, technical references that describe the addition of nanoparticles to increase the refractive index of plastics include: C. Becker, P Mueller, H. Schmidt; "Optical and Thermomechanical Investigations on Thermoplastic Nanocomposites with Surface-Modified Silica Nanoparticles," SPIE Proceedings Vol. 3469, pp. 88–98, July 1998; and, B. Braune, P. Mueller, H. Schmidt; "Tantalum Oxide Nanomers for Optical Applications," SPIE Proceedings Vol 3469, pp. 124–132, July 1998. While these references disclose the use of nanoparticles to modify refractive index of optical plastics they do not discuss the issue of refractive index stability with respect to temperature which requires a different set of characteristics in the nanoparticle.

U.S. Pat. No. 6,020,419 issued to M. Bock, et al., discloses the use of nanoparticulate fillers in a resin based coating for improved scratch resistance. U.S. Pat. No. 5,726,247 issued to M. Michalczyk, et al., also describes a protective coating that incorporates inorganic nanoparticles into a fluoropolymer. While scratch resistance is important in plastic optics, the nanoparticles that would be suitable for scratch resistance would be very different from those with the specific properties needed to improve refractive index stability with respect to temperature.

U.S. Pat. No. 3,915,924 issued to J. H. Wright describes a nanoparticulate filled clear material for filling voids. U.S. Pat. No. 5,910,522 issued to H. Schmidt, et al., describes an adhesive for optical elements that includes nanoscale inorganic particles to reduce thermal expansion and improved structural properties at elevated temperatures. While the inventions described in these patents represents some progress in the art, none of them address specific optical properties of the modified plastic material particularly as these properties relate to temperature sensitivity.

WIPO Patent WO9961383a1 discloses a method for producing multilayered optical systems that uses at least one layer that contains nanoparticulate fillers to form a layer with a different refractive index than the substrate to create an interference filter or an antireflection layer. Obviously, this patent is addressing another form of modification of the index of refraction and such is not concerned with the stability of the index of refraction with respect to temperature.

Skilled artisans will appreciate that a wide variety of materials are available in nanometer particle sizes that are well below the wavelength of visible light. Representative materials may be acquired from companies such as Nanophase Technologies Corporation and Nanomaterials Research Corporation. By selecting nanoparticle materials based on properties other than index of refraction, our experience indicates that it is now possible to modify other optical properties of plastics.

While there have been several attempts to modify properties of plastics using nanoparticles, none of these attempts have proven successful in producing optical plastic articles with temperature stable optical properties while retaining important processing characteristics.

Therefore, a need persists in the art for optical plastic articles, such as lenses, and a method of making same that have temperature stable optical properties.

SUMMARY OF THE INVENTION

It is, therefore, an object of the invention to provide an optical nanocomposite material that has reduced temperature sensitivity.

Another object of the invention is to provide an optical article, such as a plastic lens, that maintains stability over a broad range of temperatures.

Yet another object of the invention is to provide a method of manufacturing an optical article having reduced temperature sensitivity.

It is a feature of the optical article of the invention that a select nanoparticulate dispersed into a plastic host material having a temperature sensitive optical vector that is directionally opposed to the temperature sensitive optical vector of the nanoparticulate filler.

To accomplish these and other objects, features and advantages of the invention, there is provided, in one aspect of the invention, a polymethylmethacrylate nanocomposite optical particle article comprising: a polymethylmethacrylate host material having a temperature sensitive optical vector $x_1$ and nanoparticles dispersed in said polymethylmethacrylate host material having a temperature sensitive optical vector $x_2$, wherein said temperature sensitive optical vector $x_1$ is directionally opposed to said temperature sensitive optical vector $x_2$.

In another aspect of the invention, there is provided a method of manufacturing a polymethylmethacrylate nanocomposite optical plastic article, comprising the steps of:

(a) providing a polymethylmethacrylate host material having a temperature sensitive optical vector x, and nanoparticles having a temperature sensitive optical vector $x_2$, wherein said temperature sensitive optical vector $x_1$ is directionally opposed to said temperature sensitive optical vector $x_2$;

(b) dispersing said nanoparticles into said polymethylmethacrylate host material forming a polymethylmethacrylate nanocomposite material; and, (c) forming said polymethylmethacrylate nanocomposite material into said polymethylmethacrylate nanocomposite optical plastic article.

Hence, the present invention has numerous advantageous effects over existing developments, including: (1) the resulting nanocomposite has a significantly lower dn/dT (change in refractive index with temperature); (2) lenses made with the nanocomposite material have more stable focal length over a given temperature range; (3) low levels of dn/dT are achievable in the nanocomposite material with reduced loading of the nanoparticulate; (4) the viscosity of the nanocomposite material is not significantly higher than the base plastic so that conventional plastic processing techniques can be used; and, (5) the nanocomposite material has improved barrier properties so that the change of refractive index with respect to humidity will be reduced compared to the base plastic.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1:
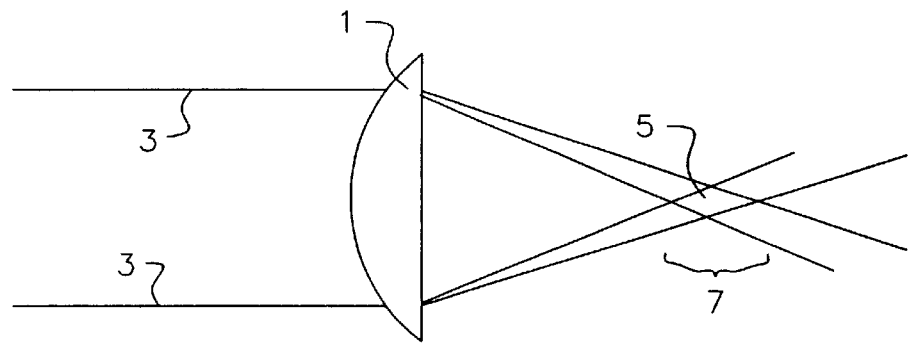
FIG. 1 is a plastic lens showing a range of focal length variation produced by a change in temperature and the resulting change in refractive index.

Referring first to FIG. 1, it is well known that in a typical prior art lens 1, focal length varies significantly with changes in temperature (T). The relationship between focal length and refractive index is given by the below equation:

$$f=R/(n-1); \qquad \text{Equation 1}$$

wherein (f) is the focal length of the lens 1 produced as incident light 3 goes through the lens 1 and is focused at focal point 5, (R) is the radius of the lens surface, and (n) is the refractive index of the lens material.

In the case of a camera lens (not shown), the temperature range of operation can easily be 50° C. when used to photograph a tropical island and then later used to photograph a snowy mountain. As an example, a lens 1 having a 10 mm radius and made, for instance, of polymethylmethacrylate, the index of refraction (n) at room temperature is 1.492 and the focal length (calculated from Equation 1 above) is 20.325 mm.

In a typical prior art lens 1 comprising a plastic material selected from Table I, the change in refractive index (dn) over the temperature range of operation is 0.0055 and the change in focal point 5 shown as the change in focal length 7 (FIG. 1) of the lens from Equation 1 is 0.225 or 1%. Skilled artisans will appreciate that the image quality of images made with the lens 1 will not be the same over the entire operating temperature range due to variations in focus quality.

Figure 2A:
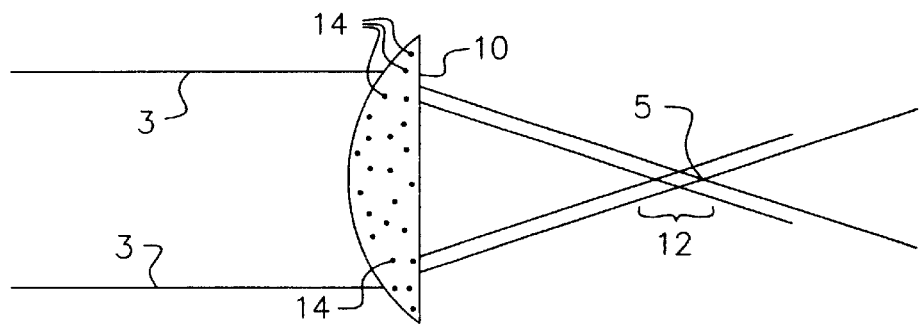
FIG. 2a shows a lens made from a nanocomposite material that has improved stability of refractive index with respect to temperature and an associated reduced range of focal length variation produced by a change in temperature.

Turning now to FIG. 2a, the reduced temperature sensitive, nanocomposite optical article or lens 10 of the invention is illustrated. According to FIG. 2a, the nanocomposite optical article or lens 10 is composed of a plastic host material 16 and a select nanoparticulate material dispersed in the plastic host material 16. Polymeric host material 16 may be either a thermoplastic or thermoset material. It is important to the invention that the polymeric host material be selected based on a predetermined temperature sensitive optical vector $x_1$, for instance refractive index n. Similarly, the selection of the nanoparticulate material dispersed in the polymeric host material 16 must be based on a corresponding predetermined temperature sensitive optical vector $x_2$, specifically refractive index. In this case, temperature sensitive optical vectors x, and $x_2$ are defined by a change in refractive index (dn) of the polymeric host material 16 and the nanoparticulate material, respectively, with respect to a change in temperature (dT). It is further important to our invention that $x_1$ is directionally opposed to $x_2$. By carefully selecting a nanoparticulate material having a dn/dT, i.e., a rate of change of refractive index with respect to temperature, that has a sign that is directionally opposed to the dn/dT of the polymeric host material 16, it is possible to significantly reduce the dn/dT of the resulting nanocomposite material at relatively low loadings of the nanoparticulate material. As a result, the viscosity of the nanocomposite material is not drastically increased and the processing characteristics will be similar to other optical plastics. Consequently, the resulting optical nanocomposite lens 10 has a focal length range 12 (FIG. 2a) over the operating temperature range that is much less than that exhibited by the prior art lens 1 shown in FIG. 1. According to Tables I and II, several select dn/dT values for polymeric host materials (plastics) and inorganic nanoparticulate fillers that comprise the nanocomposite material of the invention are illustrated.

TABLE 1

Approximate dn/dT for Various Optical Plastics

| Plastic | dn/dT ($10^{-6}$/° C.) |
|---|---|
| Polymethylmethacrylate | −105 |
| Polystyrene | −127 |
| Polycarbonate | −114 |
| Polystyrene | −110 |
| Cyclic olefin copolymer | −102 |
| Polysulfone | −100 |

TABLE 2

Approximate dn/dT for Various Inorganic Materials with Transmission Bands in Visible Wavelengths

| Material | dn/dT ($10^{-6}$/° C.) |
|---|---|
| Barium fluoride | −16 |
| Aluminum oxide | 14 |
| ALON | 12 |
| Berryllium oxide | 10 |
| BBO | −16 |
| Diamond | 10 |
| Calcium carbonate | 7 |
| Calcium fluoride | −10 |
| Cesium bromide | −85 |
| Cesium iodide | −99 |
| Pottasium bromide | −42 |
| Pottasium chloride | −36 |
| Pottasium fluoride | −23 |
| Pottasium iodide | −45 |
| Pottasium titano phosphate | 12 |
| Lithium borate | −7 |
| Lithium fluoride | −17 |
| Lithium iodate | −80 |
| Magnesium aluminate | 9 |
| Magnesium oxide | 19 |
| Sodium bromide | −40 |

TABLE 2-continued

Approximate dn/dT for Various Inorganic Materials with Transmission Bands in Visible Wavelengths

| Material | dn/dT ($10^{-6}$/° C.) |
|---|---|
| Sodium chloride | −35 |
| Sodium fluoride | −13 |
| Sodium iodide | −50 |
| Silicon oxide | −5 |
| Quartz | 12 |
| Telurium oxide | 9 |
| Titanium dioxide | −1 |
| Yttrium oxide | 8 |
| Zinc Sulfide | 49 |

Figure 2B:
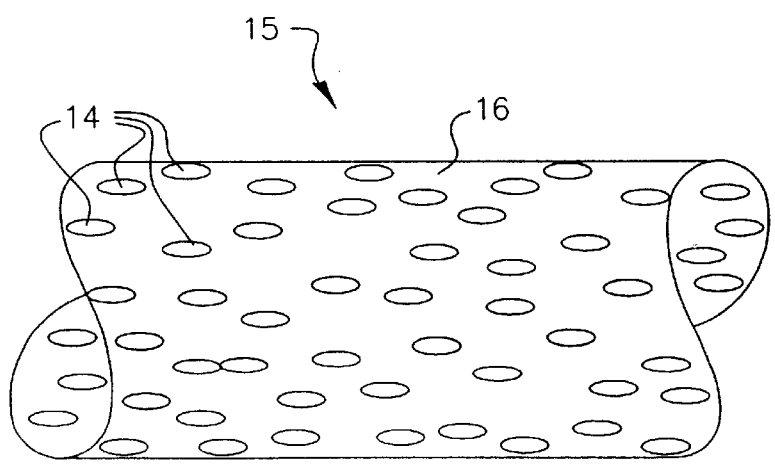
FIG. 2b shows a representative view of the nanocomposite material before forming into an optical article.

In addition to the polymeric host material 16 and the nanoparticulate material having directionally opposed dn/dT, the invention contemplates other qualifications for the nanoparticulate material to make the useful, novel and unobvious optical nanocomposite material of the invention. For instance, the nanoparticulate material must be transparent in the wavelength region of interest to maintain high optical transmission levels. Moreover, the nanoparticulate must be available in a particle size range that is less than 40 nm to avoid scattering light. Most preferred is a particle size range below 20 nm. Further, it must be possible to disperse the nanoparticles into the base or host plastic such that no significant amounts of agglomerates and/or voids larger than 40 nm occur which would scatter light. FIG. 2b shows a representative view 15 of the nanoparticles 14 dispersed into the plastic host material 16. The nanoparticles 14 are shown dispersed evenly throughout the host material 16. The nanoparticles 14 do not have any larger agglomerates or voids associated with them. Furthermore, the cost of the nanoparticulate and any associated surface treatments of the nanoparticles to improve dispersibility must be low enough that the total cost of the optical article is significantly less than a glass article.

As illustrated in Tables I and II, there exists a number of inorganic materials that have dn/dT values with an opposite sign compared to polymeric host materials. Thus, a nanocomposite material with significantly improved refractive index stability with respect to temperature can be formulated by dispersing a select nanoparticulate material into a polymeric host material 16 that have directionally opposed (or opposite signs) dn/dT.

According to another aspect of the invention, a method of manufacturing a reduced temperature sensitive optical article or lens 10 (as described above) includes the step of selecting a polymeric host material 16, such as one described in Table 1. According to the invention, the selected polymeric host material 16 has a temperature sensitive optical vector $x_1$ or dn/dT, as described above. A nanoparticulate material (Table II) is selected for dispersing in the plastic host material 16. The select nanoparticulate material, according to the invention, is required to have a compatible corresponding temperature sensitive optical vector $x_2$. Moreover, it is further important to the invention that $x_1$ is directionally opposed to $x_2$, i.e., one of the two must be negative and the other positive. Once the nanoparticulate material is selected, it is then dispersed in the host material 16 using suitable dispersion techniques, such as compounding or solvent dispersion. Once the nanoparticulate material is dispersed into the polymeric host material 16, a nanocomposite material is formed. The nanocomposite material can then be used to form an array of optical articles such as the lens 10 of the invention having reduced temperature sensitivity.

Figure 3:
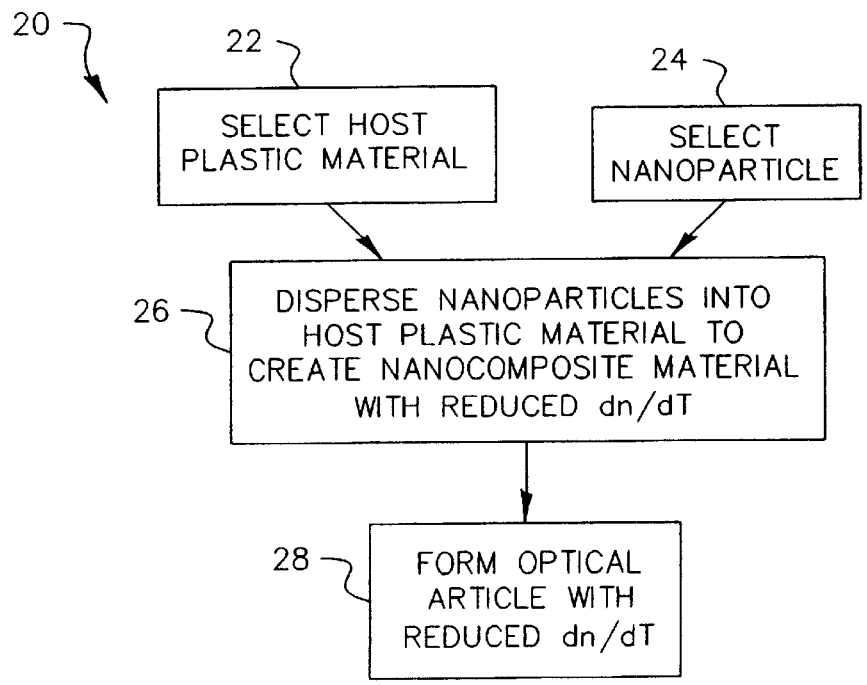
FIG. 3 is a block diagram of the process for manufacturing a plastic optical article with improved refractive index stability.

Referring to FIG. 3, a diagram of the method 20 for making the reduced dn/dT nanocomposite material for optical articles, such as lens 10, is depicted. First the polymeric host plastic material 22 is selected based on optical, structural and thermal design considerations such as % transmission, % haze, index of refraction, yield strength at a temperature, impact strength, scratch resistance, glass transition temperature, etc. Second, the nanoparticulate material 24 is preferably selected based on dn/dT, transparency in the wavelength region of interest, particle size, cost, and availability. As disclosed in this invention, selecting suitable nanoparticulate materials 24 requires selecting materials having a dn/dT that has a sign that is opposite to the host plastic material being used and an average particle size less than about 40 nm. Third, the nanoparticles are preferably dispersed 26 into the host material although other mixing processes could be used, such as roll milling. Dispersion 26 can be accomplished through preferably compounding (refer to FIG. 4) even though solvent dispersion (refer to FIG. 5) can be used with good results. Fourth, the optically modified material 28 is formed into an optical article or lens 10 of the invention.

Figure 4:
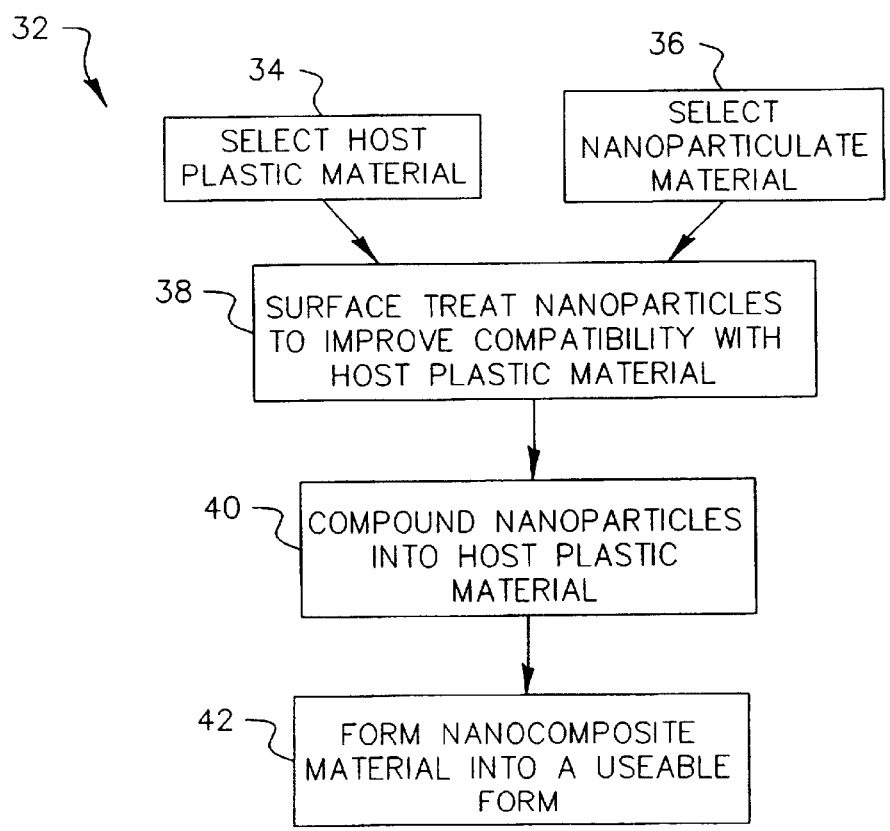
FIG. 4 is a schematic diagram of a nanocomposite material making process based on compounding; and, FIG. 5 is a schematic diagram of a nanocomposite material making process based on solvent dispersion.
Figure 5:
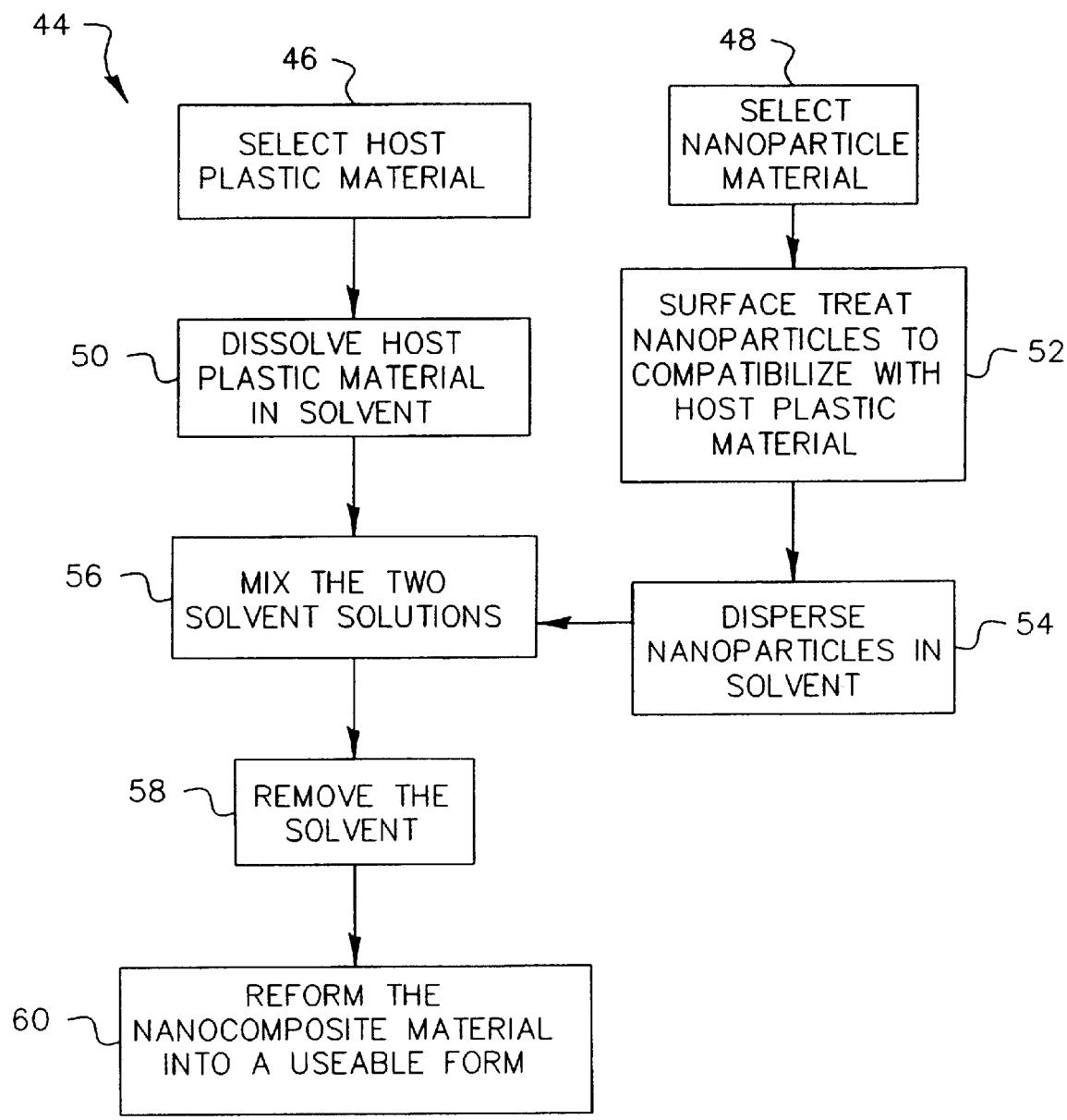

Referring to FIGS. 4 and 5, two methods of dispersing the nanoparticles into the host material are schematically illustrated. According to FIG. 4, an outline of the process for dispersion through compounding 32 is depicted. In compounding 32, the selected nanoparticles 36 are fed into a compounder 40, such as a twin screw extruder or a Farrell continuous mixer, along with pellets of the selected host material 34. After compounding 40, the optically modified material is pelletized 42 for use in an injection molding machine (not shown). As shown in FIGS. 4 and 5, a surface treatment 38 and 52, respectively, may be needed to make the nanoparticles 36 compatible with the host material 34. Skilled artisans will appreciate that this treatment could be applied to the nanoparticles 36 directly or added as an additive to the compounder 40 along with the nanoparticles 36 and the host material 34.

According to FIG. 5, in the solvent-based dispersion process 44, the selected host plastic material 46 and the selected nanoparticles 48 are dispersed in solvents 50, 54, respectively, prior to mixing 56 the two solvent solutions. The selected nanoparticles 48 are preferably exposed to an intermediate solvent dispersion step 54 to insure that a good dispersion is obtained and all agglomerates are broken up. After mixing the two solvent solutions together in step 56, the solvents are removed in step 58 and the optically modified material is pelletized 60 for use in an injection molding machine (not shown).

Following both techniques for making the optically modified material, the end result is plastic pellets which contain fully dispersed nanoparticles such as shown in FIG. 2b with the nanoparticles being present in sufficient quantity to deliver the reduced dn/dT desired.

Injection molding, compression molding and casting are the three preferred techniques for forming the optical article 10 (refer to FIG. 3 step 28) of the invention.

In a preferred embodiment, the nanocomposite optical article of manufacture 10 is comprised of a polymeric host material selected from the group consisting of thermoplastic materials and thermoset materials. Thermoplastic materials used in optical articles include: polymethylmethacrylate, polycarbonate, polystyrene, polysulfone, cyclic olefins, and blends and copolymers of those listed. Thermoset materials used in optical articles include: diallyl glycolcarbonate, epoxides, and thermoset polyesters.

Typically the reduced dn/dT article of manufacture 10 produced within the contemplation of the invention are simple lenses, an array of lenses, opthalmic lenses, window glazing, optical fibers, cover glasses for digital imagers, microlenses on digital imagers, and other optical devices of the like.

Skilled artisans will appreciate that modification of the optical properties of the host material is achieved, in accordance with the method of the invention, by reducing the dn/dT of the nanocomposite material. In our preferred embodiment, this is achieved by dispersing a nanoparticulate material filler having a dn/dT with a sign that is opposite that of the base plastic.

EXAMPLE 1

An exemplary example of the aforementioned procedure for reducing the dn/dT of an optical plastic follows.

Polymethylmethacrylate nanocomposite optical plastic comprises a polymethylmethacrylate host material having a temperature sensitive optical vector $x_1$ and a magnesium oxide nanoparticles having a temperature sensitive optical vector $x_2$ dispersed in the polymethylmethacrylate host material. According to the requirements of the invention, $x_1$ is directionally opposed to $x_2$.

More particularly, a polymethylmethacrylate host material is optically modified with the addition of magnesium oxide nanoparticles. Polymethylmethacrylate has a dn/dT of approximately $-110E-6/^\circ$ C. as shown in Table 1. Magnesium oxide has a dn/dT of approximately $+19E-6/^\circ$ C. Magnesium oxide nanoparticles are available from Nano Materials Research in the 10 nm size. Magnesium oxide is transparent in the region 0.35–6.8 micron which includes the visible light region. The volume (%) of magnesium oxide nanoparticles required in the polymethylmethacrylate host material to reduce the dn/dT by 50% can be calculated based on volume using Equation 2, below.

$$v_{50} = 0.5(\gamma_p/\gamma_p - \gamma_n) \qquad \text{Equation 2}$$

Wherein, $v_{50}$ is the volume % of the nanoparticles needed to reduce the dn/dT of the nanocomposite by 50% compared to the host plastic; $\gamma_p$ is the dn/dT of the host plastic (See FIG. 1); $\gamma_n$ is the dn/dT of the nanoparticle material.

For the combination of polymethylmethacrylate and magnesium oxide, the volume (%) of nanoparticles needed to reduce the dn/dT of the nanocomposite by 50% compared to the dn/dT of the polymethylmethacrylate is approximately 42%.

Referring to FIG. 4, magnesium oxide nanoparticles were compounded into polymethylmethacrylate. In this case, a compatibilizer additive, Solsperse 21000 from Avecia Ltd. at 10% by weight of the nanoparticles was mixed in with the polymethylmethacrylate pellets to aid in dispersing the magnesium oxide nanoparticles. Compounding was done in a twin screw extruder. Lenses were then molded from the pellets produced from compounding. The resulting dispersion of the nanoparticles in the lenses was quite good when examined under the scanning electron microscope.

EXAMPLE 2

Alternatively, the nanocomposite material above was prepared using a solvent based dispersion process as shown schematically in FIG. 5, with toluene or xylene. The solvent based dispersion process has been successful for wide variety of polymers (polymethylmethacrylate, polystyrene, polycarbonate and cyclic olefin) as well as a variety of nanoparticles (titanium dioxide, magnesium oxide and zinc oxide). The dispersion of the nanoparticles is accomplished in a mill to break up the agglomerates. As a result, well-dispersed solutions have been produced.

Referring again to FIG. 5, solvent removal 58 can be accomplished at moderate temperature with vacuum. The dried material is then run through an extruder to form pellets. The pellets are then injection molded into optical articles using the process in Example 1.

EXAMPLE 3

In another case, a polycarbonate host material is optically modified with the addition of aluminum oxide nanoparticles. Polycarbonate has a dn/dT of approximately −114E-6/° C. as shown in Table 1. Aluminum oxide has a dn/dT of approximately +14E-6/° C. Aluminum oxide nanoparticles are available from Kemco International Associates in the 37 nm size. Aluminum oxide is transparent in the region 0.19–5.0 micron which includes the visible light region. The volume (%) of aluminum oxide nanoparticles required in the polycarbonate host material to reduce the dn/dT by 50% can be calculated based on volume using Equation 2, below.

$$v_{50}=0.5(\gamma_p/\gamma_p-\gamma_n) \quad \text{Equation 2}$$

Wherein, $v_{50}$ is the volume % of the nanoparticles needed to reduce the dn/dT of the nanocomposite by 50% compared to the host plastic; $\gamma_p$ is the dn/dT of the host plastic (See FIG. 1); $\gamma_n$ is the dn/dT of the nanoparticle material.

For the combination of polycarbonate and aluminum oxide, the volume (%) of nanoparticles needed to reduce the dn/dT of the nanocomposite by 50% compared to the dn/dT of the polycarbonate is approximately 45%.

EXAMPLE 4

In another case, a polystyrene host material is optically modified with the addition of aluminum oxide nanoparticles. Polystyrene has a dn/dT of approximately −127E-6/° C. as shown in Table 1. Aluminum oxide has a dn/dT of approximately +14E-6/° C. Aluminum oxide nanoparticles are available from Kemco International Associates in the 37 nm size. Aluminum oxide is transparent in the region 0.19–5.0 micron which includes the visible light region. The volume (%) of aluminum oxide nanoparticles required in the polycarbonate host material to reduce the dn/dT by 50% can be calculated based on volume using Equation 2, below.

$$v_{50}=0.5(\gamma_p/\gamma_p-\gamma_n) \quad \text{Equation 2}$$

Wherein, $v_{50}$ is the volume % of the nanoparticles needed to reduce the dn/dT of the nanocomposite by 50% compared to the host plastic; $\gamma_p$ is the dn/dT of the host plastic (See FIG. 1); $\gamma_n$ is the dn/dT of the nanoparticle material.

For the combination of polycarbonate and aluminum oxide, the volume (%) of nanoparticles needed to reduce the dn/dT of the nanocomposite by 50% compared to the dn/dT of the polycarbonate is approximately 45%.

EXAMPLE 5

In another case, a cyclic olefin homopolymer host material is optically modified with the addition of magnesium oxide nanoparticles. Cyclic olefin homopolymer has a dn/dT of approximately −110E-6/° C. as shown in Table 1. Magnesium oxide has a dn/dT of approximately +14E-6/° C. Magnesium oxide nanoparticles are available from Nano Materials Research in the 10 nm size. Magnesium oxide is transparent in the region 0.35–6.8 micron which includes the visible light region. The volume (%) of magnesium oxide nanoparticles required in the cyclic olefin homopolymer host material to reduce the dn/dT by 50% can be calculated based on volume using Equation 2, below.

$$v_{50}=0.5(\gamma_p/\gamma_p-\gamma_n) \quad \text{Equation 2}$$

Wherein, $v_{50}$ is the volume % of the nanoparticles needed to reduce the dn/dT of the nanocomposite by 50% compared to the host plastic; $\gamma_p$ is the dn/dT of the host plastic (See FIG. 1); $\gamma_n$ is the dn/dT of the nanoparticle material.

For the combination of cyclic olefin homopolymer and magnesium oxide, the volume (%) of nanoparticles needed to reduce the dn/dT of the nanocomposite by 50% compared to the dn/dT of the cyclic olefin homopolymer is approximately 43%.

The invention has therefore been described with reference to a preferred embodiment thereof. However, it will be appreciated that variations and modifications can be effected by a person of ordinary skill in the art without departing from the scope of the invention.

PARTS LIST 1 prior art lens
3 incident light
5 focal point of the lens
7 range of change of the focal length produced by a change in temperature of the plastic lens
10 nanocomposite lens
12 reduced range of change of the focal length produced by a change in temperature of the nanocomposite lens
14 dispersed nanoparticles
15 representation of nanoparticles dispersed into the host plastic material
16 plastic host material
20 schematic of method for making reduced dn/dT article
22 step of selecting host material
24 step of selecting the nanoparticulate material
26 step of dispersion
28 step of forming an optical article
32 compounding process
34 step of selecting host material
36 step of selecting nanoparticulate material
38 step of surface treating nanoparticles
40 step of compounding nanoparticles
42 step of forming the nanocomposite into a useable form such as pelletizing
44 solvent-based dispersion process
46 step of selecting host material
48 step of selecting nanoparticles
50 step of dissolving host material in solvent
52 step of surface treating nanoparticles
54 step of dispersing nanoparticles in solvent
56 step of mixing together products of steps 50 and 54
58 step of removing the solvent
60 step of forming a useable article

What is claimed is:

1. Polymethylmethacrylate nanocomposite optical plastic article, comprises: a polymethylmethacrylate host material having a temperature sensitive optical vector $x_1$ and nanoparticles dispersed in said polymethylmethacrylate host material having a temperature sensitive optical vector $x_2$, wherein said temperature sensitive optical vector $x_1$ is directionally opposed to said temperature sensitive optical vector $x_2$.

2. The polymethylmethacrylate nanocomposite optical plastic article recited in claim 1 wherein each of said temperature sensitive optical vectors $x_1$ and $x_2$ are defined by a change in refractive index (dn) of said polyemethylmethacrylate host material and said nanoparticles, respectively, with respect to a change in temperature (dT).

3. The polymethylmethacrylate nanocomposite optical plastic article recited in claim 1 wherein said temperature sensitive optical vector $x_1$ has a negative value of about $105 \times 10^{-6}$/degree C. and said temperature sensitive optical vector $x_2$ has a positive value of greater than about $6 \times 10^{-6}$/degree C. and less than about $50 \times 10^{-6}$/degree C.

4. The polymethylmethacrylate nanocomposite optical plastic article recited in claim 1 wherein said nanoparticles are magnesium oxide.

5. The polymethylmethacrylate nanocomposite optical plastic article recited in claim 1 wherein said nanoparticles are aluminum oxide.

6. The polymethylmethacrylate nanocomposite optical plastic article recited in claim 3 wherein said nanoparticles are calcium carbonate.

7. The polymethylmethacrylate nanocomposite optical plastic article recited in claim 4 wherein said polymethylmethacrylate host material comprises a predetermined volume (%) of said magnesium oxide nanoparticles to reduce $x_1$ by about 50%, said predetermined volume being determined by the equation:

$$v_{50} = 0.5(\gamma_p/\gamma_p - \gamma_n);$$

wherein $v_{50}$ is the volume % of said magnesium oxide nanoparticles needed to reduce the dn/dT of said polymethylmethacrylate nanocomposite optical plastic article by 50% compared to said polymethylmethacrylate host material; $\gamma_p$ is the dn/dT of said polymethylmethacrylate host material; and $\gamma_n$ is the dn/dT of said magnesium oxide nanoparticles.

8. The polymethylmethacrylate nanocomposite optical plastic article recited in claim 7 wherein said predetermined volume (%) of said magnesium oxide nanoparticles dispersed in said polymethymethacrylate host material is about 42%.

9. A method of manufacturing a polymethylmethacrylate nanocomposite optical plastic article, comprising the steps of:

(a) providing a polymethylmethacrylate host material having a temperature sensitive optical vector $x_1$ and nanoparticles having a temperature sensitive optical vector $x_2$, wherein said temperature sensitive optical vector $x_1$ is directionally opposed to temperature sensitive optical vector $x_2$;

(b) dispersing said nanoparticles into said polymethylmethacrylate host material forming a polymethylmethacrylate nanocomposite material; and, (c) forming said polymethylmethacrylate nanocomposite material into said polymethylmethacrylate nanocomposite optical plastic article.

* * * * *